United States Patent Office 3,229,732
Patented Jan. 18, 1966

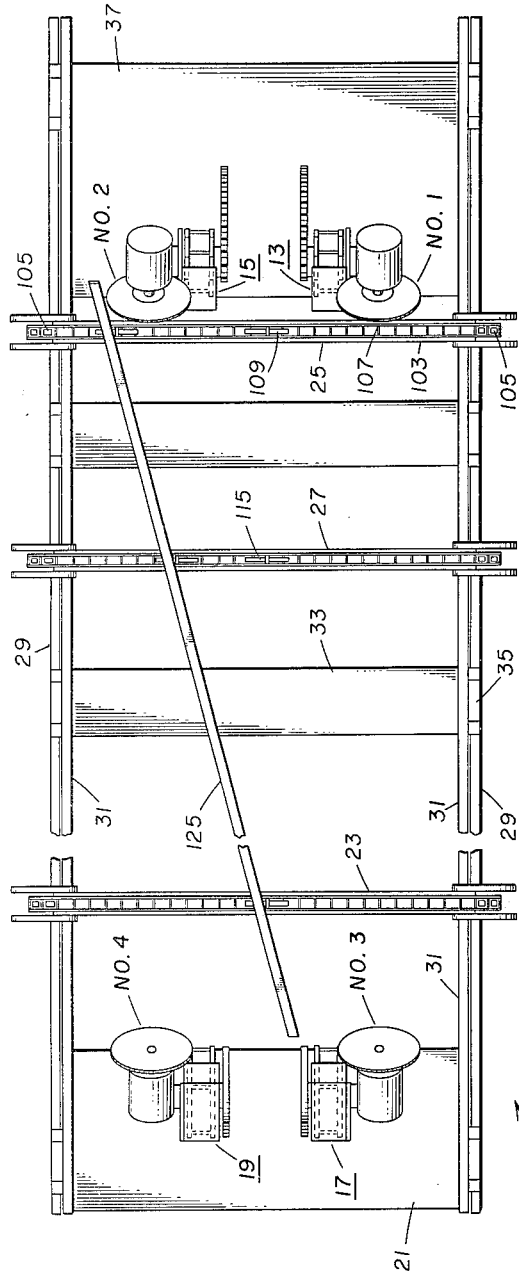
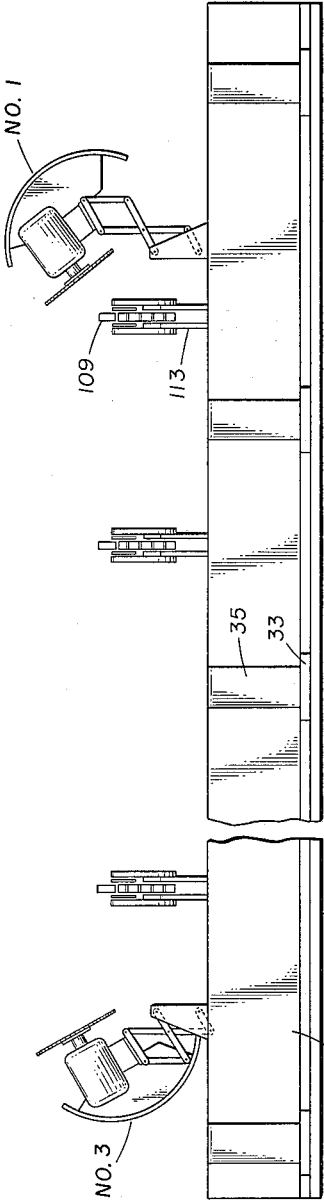

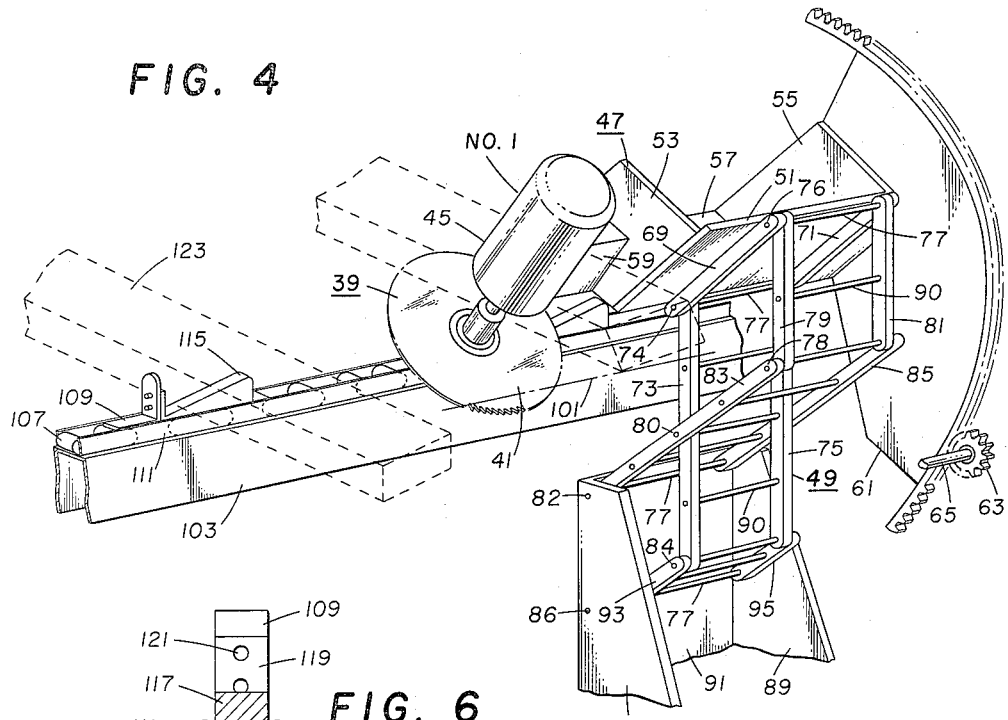
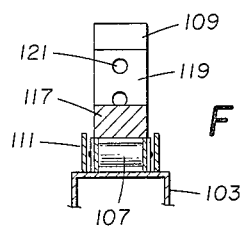
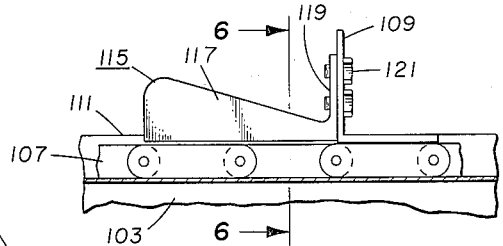
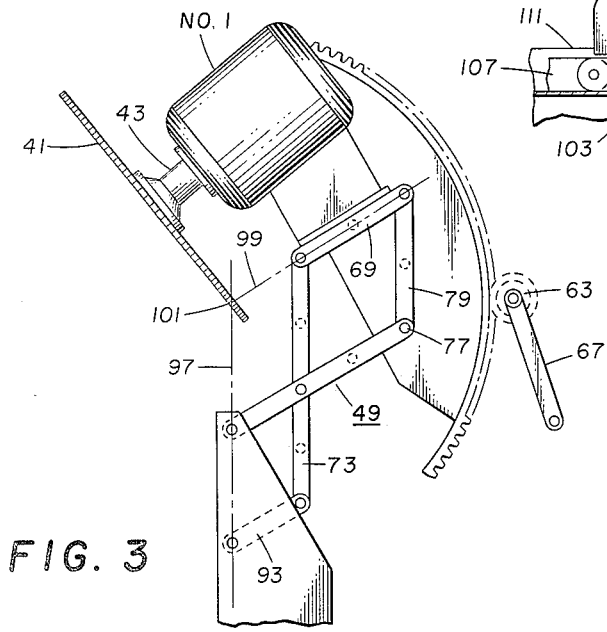

3,229,732
WOOD COMPONENT MEMBER CUTTING APPARATUS
George L. Mayo, Fort Worth, Tex., assignor to Clary Corporation, Fort Worth, Tex.
Filed Feb. 25, 1963, Ser. No. 260,589
1 Claim. (Cl. 143—38)

This invention relates to wood component member cutting apparatus, and more particularly to apparatus for mass producing pre-cut wood members to be used in building construction.

Building construction costs are determined to a large extent by the labor involved. In recent years, the labor required for fabrication of wood portions of buildings at the building site has been greatly reduced by the introduction of power saws. Even with such power saws, the workman, in most cases, still measures each piece of lumber individually and makes one cut at a time. In order to make further significant gains in labor savings, it is necessary that as much of the lumber as possible be pre-cut and fabricated before being moved to the building site. The most promising trend in this direction is that of providing pre-cut and pre-fabricated building components. This trend includes pre-fabricated building units, but it is even more significant in the building component area. Some typical building components that lend themselves to pre-cutting and pre-fabrication are roof trusses, wall sections, door framings, window framings, and floor sections. Some typical building members that may be pre-cut for use in fabrication of building components are: roof truss members, rafters, studs, floor joists, and ceiling joists.

The trend toward pre-fabricated building components emphasizes the need for effective machinery which is capable of rapidly, accurately, and economically pre-cutting wood members of building components. A machine of this general type is shown and described in my copending application entitled, "Wood Component Member Cutting Apparatus," Serial No. 143,794, filed October 9, 1961, and issued as U.S. Letters Patent No. 3,080,895. In my Patent 3,080,895, the saws at one end of the machine are mounted so that each saw blade is rotatable about a chord of the blade and these chords lie on a common axis which extends transversely of the machine. In order to achieve this saw blade rotational relationship, the saws are mounted on pivot arm structures which are pivotally fixed to the machine frame longitudinal sides, with the pivot points lying on the common axis above-mentioned. Such arrangement requires that the incoming workpieces to be sawed be conveyed up over the near side of the machine and down to the proper level for sawing and then up over the far side of the machine for removal. In addition, the saw pivot structure of the machine of Patent 3,080,895 requires that an extensive clear space be provided across the entire machine width in order to accommodate the rotational range of the saws and associated structures.

Generally stated, the object of this invention is to provide a machine of the general type disclosed by my Patent 3,080,895 but incorporating various improvements.

More specifically, an important object of this invention is to provide improved saw pivot structures and arrangements, together with attendant advantages in overall machine structure.

Another object of this invention is to provide an improved machine of the general type disclosed by my Patent 3,080,895 wherein workpieces may be conveyed onto, through and off the machine at a common level.

Another object of this invention is to provide an improved machine of the general type disclosed by my Patent 3,080,895 wherein the saw blade pivot axis is disclosed from the saw pivot mechanism.

Another object of this invention is to provide an improved machine of the general type disclosed by my Patent 3,080,895 wherein the range of rotation of a saw blade does not require a clear space across the entire width of the machine.

Another object of this invention is to provide improved tool holder pivot structures of a type wherein the tool may be rotated about a fixed axis to change the angular position of a tool cutter element relative to a workpiece.

Another object of this invention is to provide improved methods, apparatus, and arrangements for making compound cuts on workpieces.

These and other objects are effected by this invention as will be apparent from the following description taken in accordance with the accompanying drawings, forming a part of this application, in which:

FIG. 1 is a schematic plan view of a wood component member cutting machine in accordance with a preferred embodiment of the invention, but with some portions simplified and with other portions omitted for clarification purposes;

FIG. 2 is a schematic side elevational view of the simplified machine of FIG. 1;

FIG. 3 is a schematic side elevational view of a typical saw assembly including saw pivoting mechanism mounted on a saw assembly support structure;

FIG. 4 is a schematic perspective view of the saw assembly and support structure of FIG. 3 and also showing the relation of the saw to angularly supported workpieces being conveyed toward and beyond the saw to achieve a compound cut;

FIG. 5 is a schematic longitudinal sectional view of a fragment of a conveyor and chain showing a workpiece support device in accordance with one embodiment of the invention wherein compound cuts are achieved; and FIG. 6 is a sectional view taken at line 6—6 of FIG. 5.

Referring now to the drawings and particularly to FIGS. 1 and 2, there is shown a wood component member cutting machine including a main frame 11, a plurality of saw assemblies designated respectively as saw assembly No. 1, No. 2, No. 3 and No. 4. For convenient reference hereinafter the left and right ends of the machine, as viewed in FIG. 1, are designated respectively the front and rear of the machine; the near side is designated the left side; and the far side, the right side.

The No. 1 and No. 2 saw assemblies are located and fixed at the rear end portion of the main frame and are each mounted on support structures 13, 15 which are fixed to the rear end portion of the main frame 11 on the left side and right side of the machine longitudinal center respectively. The No. 1 and No. 2 saws are fixed so that they have no longitudinal movement relative to the main frame 11. Similarly, saw assembly No. 3 and saw assembly No. 4 are each mounted respectively on support structures 17, 19 but which are fixed to a carriage assembly 21. The carriage 21 and the saw assemblies No. 3 and No. 4 are arranged for longitudinal movement along the main frame 11 as will be hereinafter explained. The No. 3 saw assembly is located on the left side and No. 4 saw assembly is located on the right side of the main frame 11 longitudinal center.

The machine includes a front conveyor assembly 23, a rear conveyor assembly 25 and an intermediate conveyor assembly 27. The conveyor assemblies are identical and the front and intermediate assemblies are movable longitudinally along the main frame 11 in a manner similar to that described in connection with the intermediate conveyor in my Patent 3,080,895.

This machine includes, also, a conveyor drive assembly, which is operatively connected to each conveyor; a hood assembly at each end of the machine; and a machine control assembly, all of which, while not specifically shown in the drawings, are similar to the same respective items shown and described in my Patent 3,080,895.

The main frame structure 11 of the machine includes a pair of base members 29, a pair of side members 31, a plurality of transverse brace members 33 and a plurality of upright members 35. The base members 29 are parallel spaced rectangular bar members running the length of the machine. These bars rest on the floor or other bearing surface upon which the machine is located when in use. The transverse brace members 33 are spaced-apart channel members that extend perpendicularly between the base members 29; the respective brace members 33 being mutually parallel and located at convenient intervals along the base members 29. The side members 31 are upright plate structures which have an elongated C-shape and which are disposed to rest perpendicularly on the transverse brace members 33. The side members 31 are supported and maintained in parallel, upright position, each adjacent a base member 29, by the upright members 35. The upright members 35 are fixed, as by welding, to both the side member 31 and the ends of each transverse brace member 33. The top longitudinal edge of the side member is set, preferably, at a level that is about one-half the height to the pivot axes of the saw assemblies, which will be described hereinafter. The precise form and construction of the main frame 11 is not a critical part of this invention; it being understood, naturally, that the main frame 11 has sufficient strength and rigidity to serve its purpose. There is located and fixed between the side members, at the rear end of the machine, preferably, a plate structure or fixed platform 37 upon which saw assemblies No. 1 and No. 2 are mounted. The platform 37 may have any suitable cross sectional form that will provide sufficient strength and rigidity to support these saw assemblies. The carriage 21 is shown in FIGS. 1 and 2 in one operative location at the front end of the machine. The carriage structure, likewise, may have any suitable cross sectional form that will provide sufficient strength and rigidity for the saw assemblies No. 3 and No. 4, which are mounted thereon. The carriage 21, as mentioned hereinbefore, is arranged for longitudinal movement along the main frame 11. The mechanism for moving the carriage may be of any suitable type, or it may be the same type of rack and pinion mechanism 53, 55 as described in my Patent 3,080,895.

The saw assemblies each include: a drive sub-assembly 39 that comprises a conventional type circular saw blade 41 which is mounted on the end of an electric drive motor output shaft 43 extending from a conventional electric drive motor 45; a drive support sub-assembly structure 47; and a pivoting mechanism 49. Each saw assembly is mounted on a respective saw support structure 13, 15, 17, 19 as indicated by FIG. 1.

Now, since the four saw assemblies are similar, it is only necessary to describe one saw assembly. For convenience, it suffices to describe saw assembly No. 1, it being understood that it is representative of all of the saw assemblies.

The drive support sub-assembly structure 47 includes a sole plate 51 to which are fixed a pair of spaced parallel end plates 53, 55 and a connecting tie plate 57 which is fixed perpendicularly to the sole plate 51 and, as by welding, to the upstanding end plates 53, 55. A rectangular shaped box beam type structure 59 is fixed, as by welding, to the end plate 53 from which it projects generally perpendicularly outward. The drive sub-assembly 39 may be removably and adjustably secured to the outer end of the structure 59 in any suitable manner; the sub-assembly being so mounted on the structure that the axis of the electric drive motor output shaft 43 is substantially parallel to the end plate 53. The end plate 55 is fixed to the plate portion of a sector gear 61 which is driven by a sector drive pinion 63 mounted on a sector drive pinion shaft 65. As may be noted in FIG. 3, a crank 67 may be attached to the shaft 65 for the purpose of rotating the sector gear 61 and incidentally the saw sub-assembly 39.

As seen best in FIGS. 3 and 4, the pivoting mechanism 49 includes a plurality of bar-like link members that are pivotally connected together to form a unit (hereinafter sometimes referred to as a parallelogram linkage arrangement) that is connected at one end to the drive support sub-assembly structure 47 and at the other end to the saw support structure 13. A first pair of link members 69, 71 are fixed to the under surface of the sole plate 51 and arranged in spaced parallel relation to each other and to the axis of the electric drive motor output shaft 43. One end of each of a second pair of depending link members 73, 75 is pivotally connected to a respective end of each of the first pair of link members 69, 71. One end of one of a plurality of rods 77 is disposed through a pair of matching holes in the link members 69, 71; the other end being disposed through a pair of matching holes in the link members 73, 75. Thus, the rod 77 forms a convenient pivot pin arrangement for the respective pairs of link members, establishing a sixth pivot axis 74. One end each of a third pair of link members 79, 81 are pivotally connected, by means of another rod 77, to the other end of the respective link members 69, 71 establishing a seventh pivot axis 76; the link members 79, 81 being preferably about one-half as long as the link members 71, 73. A fourth pair of link members 83, 85 are pivotally connected by another rod 77 to the free end of the respective link members 79, 81 establishing a fifth pivot axis 78. The link members 83, 85 are disposed parallel to the link members 69, 71 and pivotally connected by another rod 77 to the respective link members 71, 73 at or near the mid-length point thereof establishing a fourth pivot axis 80.

The saw support structure includes a pair of spaced parallel side plates 87, 89 that are fixed at the bottom ends (not shown) to the carriage 21 at the front end of the machine (or to the platform 37 at the rear end of the machine). The plates 87, 89 are maintained in spaced parallel relation by a connecting tie plate 91 which is joined to each along one vertical edge. The free ends of the link members 83, 85 are each connected by another rod 77 to the upper portion of the plates 87, 89 of saw support structure 13 establishing a second pivot axis 82. A fifth pair of link members 93, 95 are each pivotally connected at one end by another rod 77 to the free end of respective link members 73, 75 establishing a third pivot axis 84. The link members 93, 95 are disposed parallel to the link members 83, 85, the free end of each being pivotally connected by another rod 77 to the plates 87, 89 of the saw support structure 13 beneath the fifth pivot axis 82, thus establishing a first pivot axis 86.

It has been found convenient to fix and maintain the several pairs of link members in spaced parallel relation by a plurality of spreader rods 90 which may be disposed intermediate the pivot rods 77. It will be noted from FIG. 3 that the second and first pivot axes 82, 86 in the saw support structure 13 lie in a plane 97 which intersects another plane 99 which passes through the sixth and seventh pivot axes 74, 76. The line of intersection of the planes 97, 99, when extended, becomes a chord 101 of the saw blade 41. Now, since the link members 83, 85, and 93, 95 are pivotally fixed to the saw support structure 13, and since the other link members are pivotally connected and arranged as the sides of parallelograms, it follows then that, as the sector gear drive pinion moves the sector gear and the saw sub-assembly 39, the several pairs of link members maintain their respective parallelogram relation. The plane 97, of course, remains fixed in its position while the plane 99 rotates about its line of intersection with plane 97 as the sector gear 61 moves. But, the plane 99 will continue to intersect the plane 97 in the extended chord line 101. Thus, the chord line 101 becomes the axis of pivot for the saw blade 41.

As hereinbefore stated, the machine has four saw assemblies; No. 1 and No. 2 being located at the rear end of the machine; No. 3 and No. 4 being located at the front end of the machine. Each of the saw assemblies is similar to the saw assembly No. 1 described hereinbefore except that in the saw assemblies No. 2 and No. 4 the drive support sub-assembly 47 is on the opposite side of the pivoting mechanism 49. In addition, each saw assembly is provided with an indicia scale, with a fixed reference marker, and a brake mechanism for locking each sector gear, all of which may be similar to that which is shown and described in my Patent 3,080,895.

As mentioned hereinbefore, saw assemblies No. 3 and No. 4 are fixed to the carriage 21 which is adapted for movement longitudinally along the main frame. The carriage assembly structure and the carriage drive mechanism for moving same may also be similar to the structure and mechanism shown and described in my Patent 3,080,895.

As before mentioned, the workpiece conveyors 23, 25, 27 are alike and conveyors 23, 27 are arranged to move longitudinally along the main frame structure. Each conveyor assembly is similar to the intermediate conveyor assembly 17 shown and described in my Patent 3,080,895 except that in the present machine the conveyor assembly extends above and beyond the side members 31 both on the near and the far sides. This is a feature which is a result of the fact that the side members 31 in the present machine need not be and are not as high as in the machine described in my Patent 3,080,895. Each conveyor assembly, as for example conveyor assembly 25, includes a main frame 103 which has basically a channel cross sectional form, and a pair of chain sprockets 105 rotatably mounted to the frame 103 at each end thereof; a conveyor chain 107 and a plurality of L-shaped workpiece engaging dogs 109 fixed to and projecting outwardly from the conveyor chain 107 at spaced intervals. The chain is conveniently supported on the top surface of the frame 103 and is maintained, in a selected path therealong, by a pair of spaced parallel side bars 111 which are fixed to the frame as by welding. The conveyor chain 107 of each conveyor is driven by a common powered conveyor drive shaft (not shown) which is similar to the arrangement shown and described in my Patent 3,080,895. Each of the conveyors 23, 25, 27 is provided with a plurality of L-shaped workpiece engaging dogs 111 that are fixed in spaced apart relation to the links of each conveyor chain. The dogs of each conveyor may be aligned with the other conveyor dogs in a simple and expeditious manner. This includes lifting the conveyor chain (which is always slack beneath the main frame 103) of a conveyor off the drive sprocket and jumping sprocket teeth as necessary until alignment is achieved, and then lowering the chain again onto the drive sprocket. And so, when the upright legs of the aligned dogs engage a workpiece, they move the workpiece transversely of the machine, toward and through the saws; the axis of the workpiece remaining parallel to the longitudinal axis of the machine. Each conveyor 23, 25, 27 may be moved longitudinally along the main frame srtucture 11 by apparatus similar to that shown and described in my Patent 3,080,895 or in any other suitable manner. And so, the conveyors 23, 25, 27 may be conveniently located to suit any length of workpiece.

In the machine of my Patent 3,080,895, it was possible to adjust the position of the saw blades with respect to the saw drive assembly support structure (as shown by FIG. 26 of Patent 3,080,895), and similar arrangements are made for the machine of the present invention. In the present invention, the height of the conveyor assembly also is adjustable by means of a rack and pinion (not shown) in each conveyor support leg 113.

In my Patent 3,080,895 it is stated that a material hold-down ski assembly was provided at each end of the conveyed material; each ski assembly being adjustable and spring-biased so as to afford some flexibility in the vertical direction and yet always applying sufficient restraining pressure to the top side of the conveyed material. Such a ski assembly (or a similar one) will be fitted at each end of the present machine. Other desirable items, all of which are shown and described in my Patent 3,080,895 such as a longitudinal material stop, hood assembly over each end pair of saw assemblies, electric control assembly including start-stop switches, and conveyor drive motor with switches and controller therefor are installed on the present machine in a suitable manner.

A portion of the present invention resides in a combination including an attachment which is designated a workpiece tilt support device 115. A number of these devices 115 may be quickly and easily secured to the workpiece engaging dogs 109, whenever it is desired to make compound angular cuts on a workpiece or workpieces. The tilt support 115 (see FIG. 5) is made up of a flat bar 117 having generally trapezoidal shape in side profile and to the smaller end of which is fixed a finger 119 disposed generally perpendicular to the bottom edge of the bar 117. The finger 119 may be provided with threaded holes to receive screw bolt fasteners 121 extending through matching holes in the upright leg of the L-shaped workpiece engaging dog member 109. The bottom edge of the tilt support 115 is disposed slightly above the side plates of the conveyor chain 107, as shown in FIG. 5.

Now, in order to best explain the operation of the present machine, particular reference will be made to FIGS. 1–4. In FIG. 2, the No. 1 saw blade is set to cut a workpiece at some selected angle. At the same time No. 3 saw blade is set to cut the same workpiece at some other selected angle. It should be noted that the pivot axis 101 of both No. 1 and No. 3 saw is at the same fixed height above a datum, such as the conveyor upper surface. An important feature of the present invention is the interrelation of the drive sub-assembly, the drive support sub-assembly 47, the parallelogram linkage mechanism 49 and the saw support structure 13 such that the pivot axis 101 will remain at a constant height above a reference datum line regardless of the angle to which the saw is rotated, once the saw has been adjusted to a predetermined height above the datum. In the present machine, the datum line could, for example, be considered as the bottom of the base member 29. The four saws Nos. 1, 2, 3 and 4, being adjusted and fixed then, at some predetermined height with respect to that datum line, will thereafter pivot about the pivot axes 101 irrespective of the angle to which the saw blades may be rotated. It is convenient, therefore, to adjust the vertical position of the conveyor assemblies, in the manner mentioned hereinbefore, with respect to the fixed pivot axis of the saw, so that the workpiece will be cut as desired, while it is being carried past the saws by the dogs 109.

It will be recognized that the pivoting mechanism for the saw assemblies of the present machine can be made lighter in weight, less costly, and somewhat simpler than the saw assembly pivoting mechanism of the machine described in my Patent 3,080,895.

Another feature of the present machine is that the side structure may be made low, so that there is not only more adequate clearance around the saw assemblies and more room for access to the mechanism within the machine, but also the workpieces need not be conveyed up or down over the side structure. In the machine shown and described in my aforementioned patent, it was necessary to provide high sides because the saw assemblies were supported for pivoting directly on the side structure. However, in the present invention, the saw assemblies are individually supported on the platform 37 and the carriage 21, as described hereinbefore, there being no pivoting connection from the saw support 13 to the side structure. Therefore, the side structure may be made as low as practicable, consistent with rigidity and strength and, consequently, it may also be made more economically.

The principle of the pivoting mechanism and its interrelation with associated parts of the present invention is not limited to tools employing circular saws, but may also be applied to other types of powered tools such as routers, boring devices and the like.

In order to explain the achievement of compound cuts utilizing tilt support devices 115 of the present invention, particular reference may be made to FIGS. 4 and 5. Whenever it is desirable or necessary to make a compound cut in a regular structural wood workpiece such as, for example, a 2 x 4 or a 2 x 6, it is only necessary to install one or more devices 115 on each conveyor chain in the manner shown in FIG. 5, and as described hereinbefore. A stock wood workpiece 123 is placed on the conveyors 23, 25, 27 so that one surface of it rests on the top edge of the bar 117. The workpiece 123 will thus be tilted at the angle of the compound cut and will advance in such tilted position toward the saw blade 41. Of course, the saw will have been tilted to some predetermined angle and restrained thereat by the locking mechanism provided. The saw blade will then cut the workpiece in a plane which is not perpendicular to any face of the workpiece and, thus, will produce a compound cut. Those skilled in the art will understand that the slope of the upper edge of the bar 117 may be varied and that the angle of tilt may also be varied to produce many various desired compound cut angles. It should be noticed that the workpiece at the right of FIG. 6 has already passed the cutting plane of the saw blade 41 and has been severed in a compound cut.

In some situations it may be simpler and more convenient to make a compound cut in the following manner: Firstly, referring to FIG. 1, a workpiece 125 is laid on the conveyors in an askew position so that it abuts a conveyor chain dog of the conveyor 25, for instance. The workpiece, in this instance, is placed on the conveyors 23, 25, 27 in the same manner it would assume if it had been placed on the compound cut device 117, as described hereinbefore. That is to say, the surface which would have been in contact with the finger 119 is now in contact with the upstanding leg of the chain dog 109. The askew angle of the axis of the workpiece 125 is naturally related to the desired compound cut angle and to the angle of tilt of the saw blade. In order to set up the other conveyor dogs to abut the askew workpiece 125, it is only necessary to lift the conveyor chains of the conveyors 23, 27 and jump them over the drive sprocket until a chain dog of each conveyor chain abuts the askew workpiece, as seen in FIG. 1. Then, the chains of the conveyors 23, 27 may be lowered back onto the drive sprockets. One saw may then be set at an angle of tilt which will produce the desired compound cut on the workpiece. With the present machine, for example, it is possible to cut a workpiece 125 in a vertical plane at the front end, by saw No. 3 (saw No. 4 having been moved to its out-of-play position), and in a compound cut at the rear end, by saw No. 2 (saw No. 1 having been moved to its out-of-play position). The workpiece 125, as shown in the position of FIG. 1, has been cut in a single pass through the machine as a roof rafter for a hipped roof (assuming of course that the saws have all been appropriately positioned).

It should be mentioned that the saws No. 1 and No. 2 at the front end, and the saws No. 3 and No. 4 at the rear end, are preferably disposed in a spaced-apart or staggered transverse relation so that the various cuts are made successively. The spaced-apart, successive cutting arrangement of the saws will considerably reduce the overall electric power requirements of the machine.

As pointed out in my Patent 3,080,895, each saw may be moved to an out-of-play position; that is to say it may be rotated and adjusted until the saw blade does not cut a workpiece as it is conveyed across the machine.

The foregoing disclosure and the showings made in the drawings are merely illustrative of the principles of this invention and are not to be interpreted in a limiting sense.

I claim:

A wood component member cutting machine comprising: a main frame including side structure; first and second transversely juxtaposed fixed support structures mounted on said main frame adjacent one end thereof; a first and a second circular saw each having a blade and driving means; a pivotable support mechanism for each said saw; means mounting a respective said first and second saw on a respective said pivotable support mechanism and means mounting a respective said pivotable support mechanism on a respective said first and second fixed support structure; a carriage mounted on said main frame for longitudinal movement along said main frame; third and fourth fixed support structures mounted on said carriage; a third and a fourth circular saw each having a blade and driving means; a pivotable support mechanism for each said third and fourth saw; means mounting a respective said third and fourth saw on a respective said pivotable support mechanism and means mounting a respective said pivotable support mechanism on a respective said third and fourth fixed support structure; each said pivotable support mechanism including: first and second link members connected to said respective fixed support structure for pivotable movement about respective first and second pivot axes; third and fourth link members, said third link member being connected to said first link member for pivotable movement about a third pivot axis and to said second link member for pivotable movement about a fourth pivot axis, said fourth link member being connected to said second link member for pivotable movement about a fifth pivot axis; a fifth link member connected to said third link member for pivotable movement about a sixth pivot axis and connected to said fourth link member for pivotable movement about a seventh pivot axis; said pivot axes being all disposed in mutually spaced parallel relation and such that the distance between said first and second axes is equal to the distance between said third and fourth axes, and the distance between said fourth and sixth axes is equal to the distance between said fifth and seventh axes, and the second, fourth and fifth axes lie in a common plane; means fixing said saw relative to said fifth link member with a chord of said saw blade being coincident with the line of intersection of a first plane containing said first and second axes and a second plane which is parallel to the plane containing said sixth and seventh axes; said chords of the blades of said first and second saws being coincident with a first common transverse pivot axis; said chords of the blades of said third and fourth saws being coincident with a second common transverse pivot axis; said first and second common transverse axes being parallel and lying in a common plane; material conveyor means traversing said main frame between said saw pairs in the direction of said common transverse axes and at a predetermined level relative to said common axes and above the upper extremity of said main frame side structure, and means for moving each said saw and fixing the cutting plane of each said saw blade in any of a plurality of predetermined angular positions relative to the plane of said common axes.

References Cited by the Examiner
UNITED STATES PATENTS

| | | | |
|---|---|---|---|
| 28,986 | 7/1860 | Hurlbut | 143—38 |
| 1,322,528 | 11/1919 | Brokaw et al. | 143—49 |
| 1,807,216 | 5/1931 | Johnson | 143—49 X |
| 2,377,139 | 5/1945 | Fraser | 143—38 X |
| 2,917,089 | 12/1959 | Ennis. | |
| 3,080,895 | 3/1963 | Mayo | 143—38 |

FOREIGN PATENTS 207,101  1/1960  Austria.

WILLIAM W. DYER, Jr., *Primary Examiner.*

LEON PEAR, *Examiner.*